(12) United States Patent
Partridge

(10) Patent No.: US 11,127,020 B2
(45) Date of Patent: Sep. 21, 2021

(54) GENERATING AN ACTIVITY INFERENCE MODEL FROM CONTEXTUAL DATA

(75) Inventor: Kurt E. Partridge, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 2402 days.

(21) Appl. No.: 12/622,857

(22) Filed: Nov. 20, 2009

(65) Prior Publication Data

US 2011/0125678 A1 May 26, 2011

(51) Int. Cl.
*G06N 20/00* (2019.01)
*G06Q 30/02* (2012.01)
*G06Q 30/06* (2012.01)

(52) U.S. Cl.
CPC ............ *G06Q 30/02* (2013.01); *G06N 20/00* (2019.01); *G06Q 30/0631* (2013.01)

(58) Field of Classification Search
USPC ......................................................... 706/12
See application file for complete search history.

(56) References Cited

U.S. PATENT DOCUMENTS

| 2002/0111172 A1* | 8/2002 | DeWolf | ................. | G06Q 30/02 455/456.3 |
| 2008/0205775 A1* | 8/2008 | Brinker | ............. | G06F 17/30707 382/225 |

OTHER PUBLICATIONS

Belotti, Victoria et al "ACtivity-Based Serendipitous Recommendations with the Magitti Mobile Leisure Guide" CHI 2008 Proceedings: On the Move. Apr. 5-10, 2008. [Online] Downloaded Feb. 1, 2012. http://delivery.acm.org/10.1145/1360000/1357237/p1157-bellotti.pdf?ip=151.207.242.4&acc=ACTIVE%20SERVICE&CFID=82490356&CFTOKEN=38739077&_acm_=1328125621_e6.*

Ricci, Francesco and Quang Nhat Nguyen. "Acquiring and Revising Preferences in a Critique-Based Mobile Recommender System" Recommender Systems. IEEE 2007. [Online] Downloaded Feb. 1, 2012 http://ieeexplore.ieee.org/stamp/stamp.jsp?tp=&arnumber=4216977.*

Siddheswar Ray and Rose H Turi. "Determination of Number of Clusters in K-Means Clustering and Application in Colour Image Segmentation" 1999 [Online] Downloaded Apr. 28, 2017 http://citeseerx.ist.psu.edu/viewdoc/download?doi=10.1.1.587.3517&rep=rep1&type=pdf.*

Soulie, Juan. "Variables.Data Types." Cplusplus.com Apr. 20, 2009 verified by wayback machine [Online] Downloaded Feb. 6, 2018 https://web.archive.org/web/20090420124459/http://www.cplusplus.com/doc/tutorial/variables/.*

(Continued)

*Primary Examiner* — Ben M Rifkin
(74) *Attorney, Agent, or Firm* — Shun Yao; Park, Vaughan, Fleming & Dowler LLP

(57) ABSTRACT

One embodiment provides a system for generating an inference model that determines an activity type for a user from contextual information. During operation, the system receives a set of contextual information associated with the user, wherein the contextual information includes at least a set of location coordinates. The system then determines an association between the contextual information and an activity type. Next, the system generates an activity inference model based in part on the association, wherein the activity inference model takes an instance of contextual information as an input parameter and outputs a corresponding activity type. The model's parameters are based at least on statistics associated with the user's contextual history but not based on the complete contents of the user's contextual history.

21 Claims, 10 Drawing Sheets

(56) References Cited

OTHER PUBLICATIONS

Fleseriu, Gabriel. "C++ Tutorial: A Beginner's Guie to std::vector, Part 1" Feb. 25, 2003. [Online] Downlaoded Sep. 18, 2018 https://www.codeguru.com/cpp/cpp/cpp_mfc/stl/article.php/c4027/C-Tutorial-A-Beginners-Guide-to-stdvector-Part-1.htm.*

Schiller, Jochen and Agnes Voisard. "Location-Based Service" The Morgan Kaufmann Series in Data Management Systems. 2004 [Online] Downloaded Jul. 9, 2012. Link unknown at this time. (Year: 2004).*

Takeuchi, Yuichiro et al., "CityVoyager: An Outdoor Recommendation System Based on User Location History", Ubiquitous Intelligence and Computing Lecture Notes in Computer Science; LNCS, Springer, Berlin, DE, vol. 4159, Jan. 1, 2006, pp. 625-636.

* cited by examiner

| USER ID | LATITUDE | LONGITUDE | TIME STAMP |
| --- | --- | --- | --- |
| 16 | 37.44115257 | -122.17197890 | 1175380861000 |
| 16 | 37.44110000 | -122.17203500 | 1175380876000 |
| 16 | 37.44110000 | -122.17203500 | 1175380892000 |
| 16 | 37.44110000 | -122.17203500 | 1175380907000 |
| 16 | 37.44072392 | -122.17222304 | 1175380922000 |

GENERATING AN ACTIVITY INFERENCE MODEL FROM CONTEXTUAL DATA

BACKGROUND

Field

This disclosure is generally related to a recommender system. More specifically, this disclosure is related to a method and apparatus for inferring an activity associated with a user's location trace and contextual data.

Related Art

In today's technologically oriented society, a primary source of information is recommender systems. The purpose of most recommender systems is to help individuals discover items they might not necessarily be able to find on their own. Such a recommender system can generate personalized recommendations in response to a query from a user. Effective recommendations often depend on how accurately the system can estimate a user's needs and preferences. Some systems, such as online shopping sites, use user surveys or a user's past selections to derive such information. However, it would be difficult to gather this information in a system with limited access to a user's selection history, or where user surveys are difficult to obtain. Furthermore, typical recommender systems are not equipped to handle the large amount and variety of location and contextual information for each user.

SUMMARY

One embodiment provides a system for generating an inference model that determines an activity type for a user from contextual information. During operation, the system receives a set of contextual information associated with the user, wherein the contextual information includes at least a set of location coordinates. The system then determines an association between the contextual information and an activity type. Next, the system generates an activity inference model based in part on the association, wherein the activity inference model takes an instance of contextual information as an input parameter and outputs a corresponding activity type. The model's parameters are based at least on statistics associated with the user's contextual history but not based on the complete contents of the user's contextual history.

In one variation on this embodiment, the contextual information includes a number of timestamped location coordinates.

In one variation on this embodiment, the contextual information includes venue-specific contextual data, which facilitates identifying a correct activity type from one or more activities associated with a venue.

In one variation on this embodiment, a respective instance of contextual information indicates one or more of: a time of day, a time range, a day of week, a range of days of a week, a date, a range of dates, a weather condition, a traffic condition, a social context, a sensed motion, an ambient sound, and an ambient video feed.

In one variation on this embodiment, the system determines a venue-specific context for the user. In doing so, the system receives information indicating a set of user roles associated with a venue. The system further analyzes the contextual information associated with the venue to determine a pattern and determines a role associated for the user that matches the determined pattern.

In a further variation, the role is determined in conjunction with the activity inference model.

In a further variation, the system determines an activity type for the user that corresponds to the determined role associated with the venue.

Figure 1:
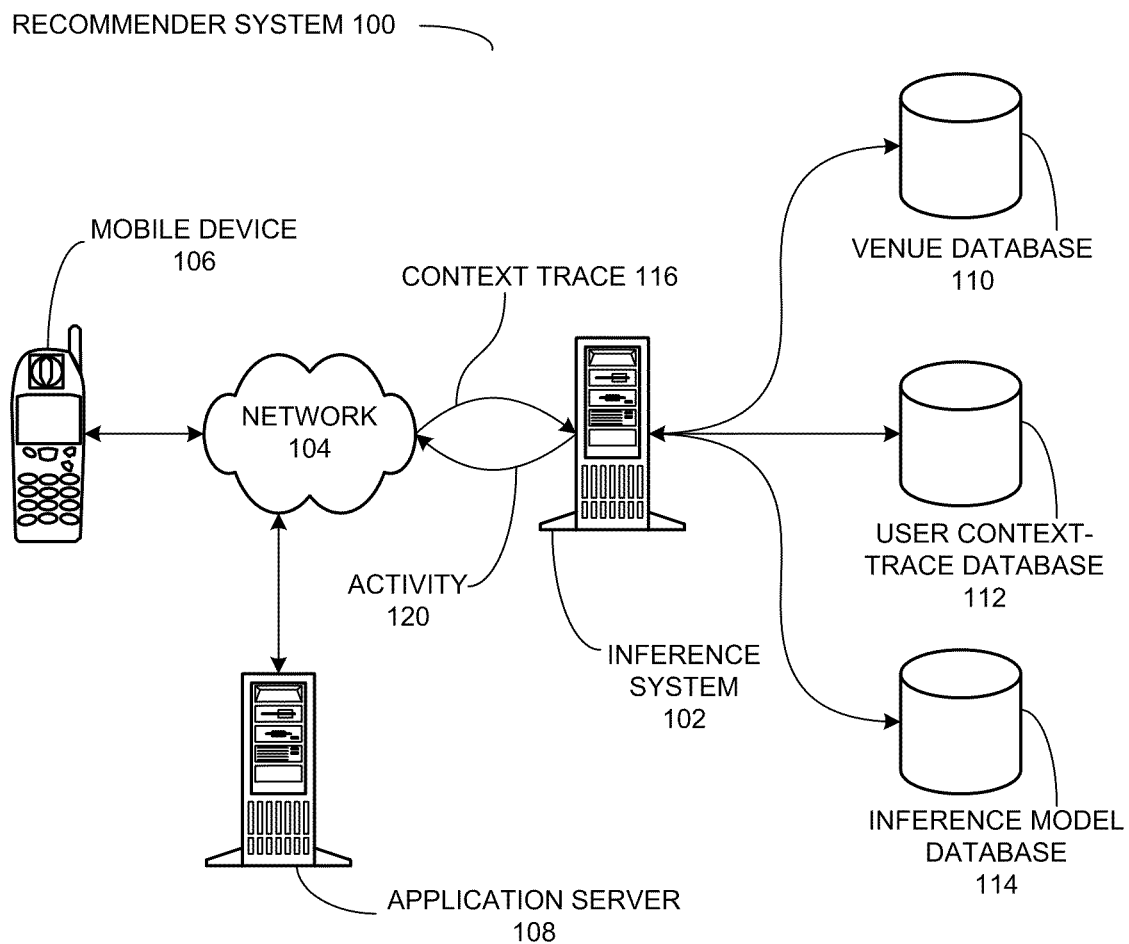
FIG. 1 illustrates an exemplary computing environment for a recommender system in accordance with an embodiment.

TABLE I presents three exemplary labels extracted from context traces taken on different days in accordance with one embodiment of the present invention.

In the figures, like reference numerals refer to the same figure elements.

DETAILED DESCRIPTION

Overview

Embodiments of the present invention provide a method and system for inferring a user's intended leisure activity from context data values using an activity inference model. The intended activity can be used by a recommender system to focus recommendations on the most relevant items. The success of a recommendation typically depends on how closely the recommended items match the user's personal interests and preferences in a given context, such as time of day, day of week, weather conditions, etc.

Embodiments of the present invention provide an inference system that predicts a user's activity preferences and habits without using surveys or requiring hand-labeled examples to learn from. Like a learning system, the inference system attempts to learn associations between data value measurements describing the user's current situation or context and the activities the user is likely to prefer in these contexts. The inference system does not need to receive explicit activity labels for user contexts, and is capable of inferring such information indirectly. The system receives sensor-generated location measurements, such as Global Positioning System (GPS) coordinates, venue descriptions, and mapping between venue descriptions (e.g., "restaurant") and activities supported by a venue type (e.g., "eating").

Using the location information, the system infers a distribution over possible activities the user might like from the activity associated with venues near the location where the context data values were measured. As a result, the system can obtain a set of activity labels, which indicate activity types associated with different context. In some embodiments, the system can obtain these activity labels directly from a user. Furthermore, the system may identify a set of activity labels that are associated with a type of venue that a user is visiting. Moreover, the system may infer a set of activity labels based on long-term patterns or characteristic of a user's activity, such as a particular form of employment. These activity labels are subsequently used to process a user's query, so that the recommended activities can better match the user's preferences.

FIG. 1 illustrates an exemplary recommender system in accordance with an embodiment. Computing environment 100 can include an inference system 102, a network 104, a mobile device 106, an application server 108, a venue database 110, a user context-trace database 112, and an inference model database 114.

During operation, inference system 102 receives a context trace 116 from a user (e.g., via mobile device 106), and can determine a corresponding activity 120 based in part on the activity inference models stored in inference model database 114. In some embodiments, inference system 102 communicates with an application server 108 that generates content for a computing device (e.g., mobile device 106). For example, application server 108 can receive GPS data from a mobile device (or from a Wi-Fi or cellular network for the computing device), and application server 108 can interact with inference system 102 to determine an activity for the computing device's user. Application server 108 can then forward the activity information to a client application running on the computing device. Furthermore, application server 108 can use the activity information to generate activity-based content for the computing device, or to perform an activity-based service for the computing device.

In some embodiments, context 118 indicates one or more of: time of day, time range, day of week, range of days of a week, date, range of dates, weather condition, traffic condition, social context, sensed motion, ambient sound, and ambient video feed. Furthermore, a social context can include a person that the user is communicating with in person, or via a communication medium (e.g., a mobile telephone, an Internet protocol (IP) telephone, a land-line telephone, a video conferencing system, an instant messaging service, e-mail, etc.).

Venue database 110 stores the venue information, which can include a venue's location, the venue's type, and certain attributes associated with the venue. For example, the venue types can include restaurant, theater, sports facility, park, etc. Venue attributes can include, for example, the type of cuisine served at a restaurant, the types of films played at a movie theater, the theme of a bar, the types of goods offered at a shop, etc.

User context-trace database 112 stores multiple context traces for one or more users. In one embodiment, a user's handheld device, which provides the leisure activity recommendation application, also includes a GPS unit. Thus, the same handheld device can generate a context trace, which includes records of location and time, for the user. Optionally, the handheld device can periodically upload these context traces to user context-trace database 112.

Inference model database 114 stores one or more activity inference models for one or more users. In some embodiments, inference system 102 performs an off-line preprocessing operation to generate an activity inference model for a user based in part on historical context traces and venue information stored in databases 110-112. Furthermore, inference system 102 can perform a runtime query processing operation that uses an activity inference model to determine an activity 120 for a user.

System Operation

In general, the operation of the inference system can be divided into two parts: an off-line preprocessing operation and a runtime query processing operation. During the off-line processing, the system collects a user's context traces, identifies hypothetical visits to various venues, and maps the venues to activity types. The system also generates one or more activity inference models, which map a context associated with a location to an inferred activity. Furthermore, the inference system can also use the same inference process to infer specific attributes of an activity such as "eating at a non-smoking venue." During the runtime query processing, the system determines an inferred activity based on the query context and the stored activity inference models.

Figure 2:
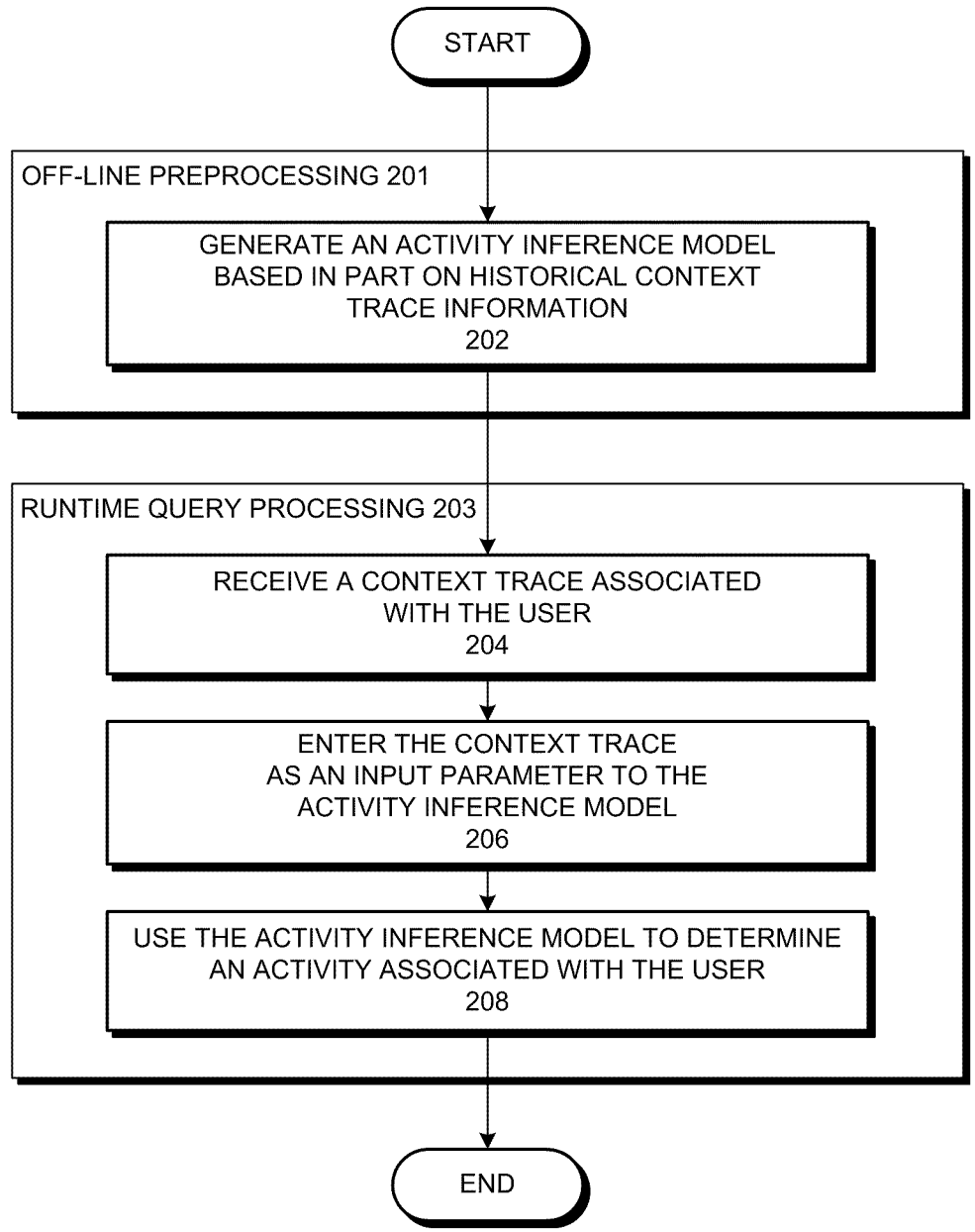
FIG. 2 presents a flow chart illustrating a process for determining an activity associated with a user in accordance with an embodiment.

FIG. 2 presents a flow chart illustrating a process for determining an activity associated with a user in accordance with an embodiment. The process can be performed on a computer system comprising a storage device that stores instructions that implement the process, and a processing unit that executes the stored instructions.

During the off-line preprocessing operation 201, the system generates an activity inference model based in part on historical context trace information (operation 202). In doing so, the system generates a set of inference points. An inference point includes data values for a set of variables that indicate an association between a context trace, a venue, and an activity. The system also groups a set of substantially similar inference points to indicate an activity for the set of similar inference points. In one embodiment, the similarity of one inference point to another can be calculated based on a distance metric defined over several inference point variables. For example, the system can compute a logical "distance" between the values for a number of variables, and determine that two inference points are substantially similar if the logical distance is below a predetermined threshold. The system can employ various ways to compute this logical distance. For example, if the variable is time of day, the system may use the difference in minutes as the logical contextual distance. In other embodiments, the system may use a physical distance between location coordinates to determine the similarity between inference points. Other definitions of inference-point similarity are also possible.

In some embodiments, system then uses the inference points to generate activity inference models. An activity inference model is a computation module, which includes data structures and/or executable code, used by the recommender system to determine an activity for a user based in part on the user's contextual information. Because the system first groups inference points that are similar to form an activity cluster, the system can generate an activity inference model by analyzing fewer data points than would be required if the inference points were used directly.

Furthermore, using the activity clusters allows the system to incorporate more user data into an activity inference model than would be possible if the inference points were used directly.

Then, during runtime query processing operation 203, the system receives a context trace associated with the user (operation 204). The system enters the context trace as an input parameter to the activity inference model (operation 206), and uses the activity inference model to determine an activity associated with the user (operation 208). The system can also use context trace information gathered during the runtime to update an existing inference model or to generate a new model. Doing so allows the system to learn new user preferences or to adjust to changes in a user's life (e.g., a new residence, a new job, a change in preferences, etc.).

Generating Activity Clusters

Figure 3:
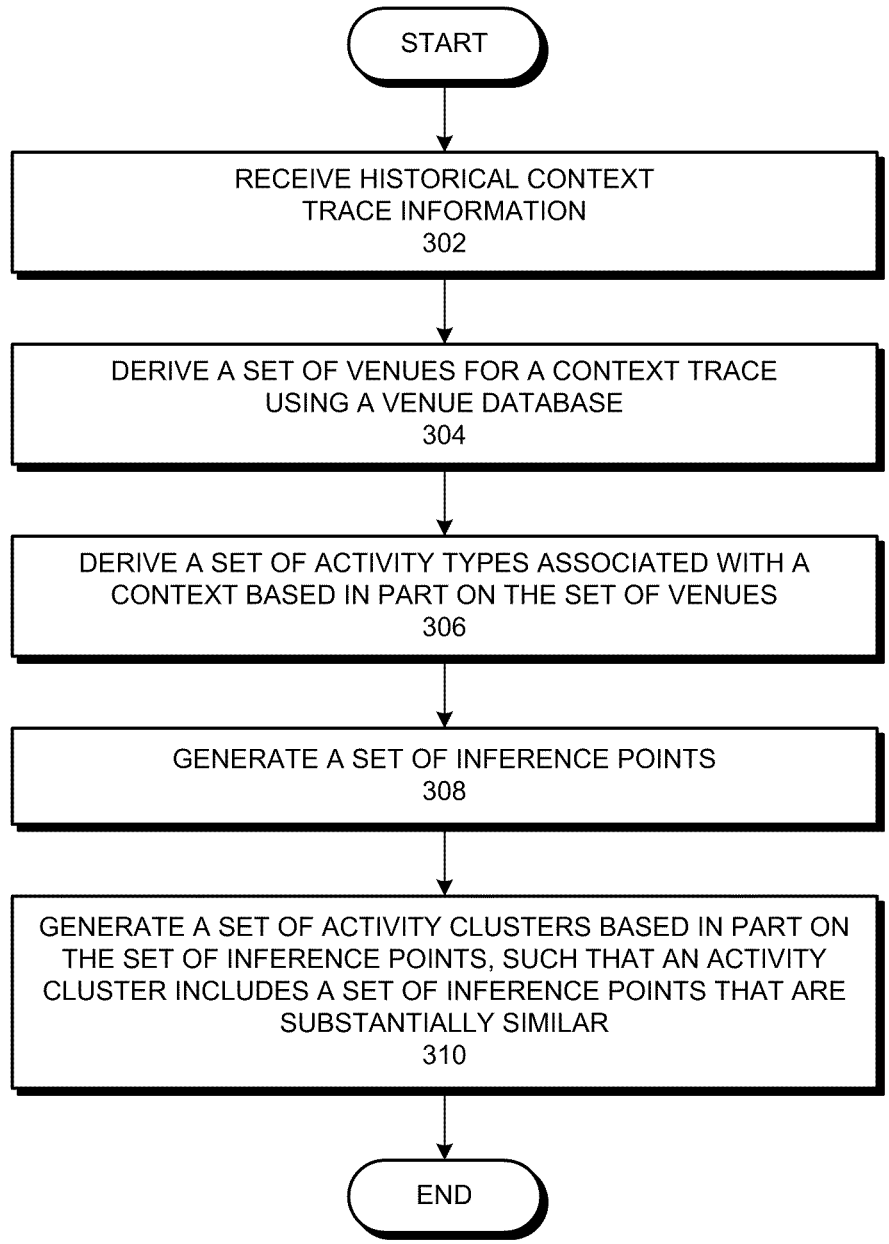
FIG. 3 presents a flow chart illustrating a process for generating a set of activity clusters from historical context trace information in accordance with an embodiment.

FIG. 3 presents a flow chart illustrating a process for generating a set of activity clusters from historical context trace information in accordance with an embodiment. The system begins by receiving historical context trace information (operation 302), and derives a set of venues for a context trace using a venue database (operation 304). Next, the system derives a set of activity types associated with a context based in part on the set of venues (operation 306). Then, the system generates a set of inference points (operation 308), such that an inference point includes data values for a set of variables that indicate an association between a context trace, a venue, and an activity. The system then generates a set of activity clusters based in part on the inference points, such that an activity cluster includes substantially similar inference points (operation 310).

Specifically, the system can perform operation 302 by receiving a context trace from a user context-trace database, as well as the venue information from a venue database. The system then performs operation 304 by analyzing the context traces, identifying locations along these traces where the user appears to have spent at least some time, and identifying the venues in the vicinity of those locations. That is, the system identifies hypothetical visits to different venues near locations in the context trace.

In some embodiments, the system faces several challenges in the process of generating these hypothetical visits. Typically, a GPS trace represents a trajectory of a user's movement. A consumer-grade GPS unit generally has a limited spatial resolution. For example, the GPS signal may not be sufficiently detailed to distinguish which side of the street the user is on. Furthermore, the user may be in an urban area with a high building density, and may experience inaccurate GPS signals due to signal reflections off building surfaces. In one embodiment, the system "smoothes" the GPS trace by considering clusters of locations during a certain time period and searching for venues in the vicinity of this cluster of locations. This way, the system can statistically remove the noise in the GPS traces and derive the desired activity information over a longer period, over multiple traces.

In another embodiment, GPS signals are smoothed using statistical processes such as a Kalman smoother.

Another issue associated with GPS signals is their limited time resolution. Typically, a GPS unit updates its location information at certain intervals, such as every 10 seconds. However, when the user is in a busy district, he may enter a shop or a subway station during this interval and lose the GPS signal. As a result, the GPS trace would be incomplete. In one embodiment, the system performs an interpolation process that fills in likely sample locations during these sensor dropouts.

In one embodiment, the system also receives contextual information associated with a context trace. Such contextual information can include the day of week and a current weather condition. This information is used by the system to further qualify an activity type and later used in conjunction with a query context when the system is handling a user query.

Next, the system identifies significant locations in the context trace. In doing so, the system identifies locations (or location clusters) where the user appears to have spent a substantial amount of time. For example, the system can search for locations at which the user remains for more than 5 minutes. Other time thresholds are also possible.

After identifying these locations, the system then searches the venue database to identify venues within the vicinity of the significant location or location cluster. For example, the system can search all the venues within 120 feet of a location, or a location range. In one embodiment, the location can be represented by a longitude/latitude pair or a pair of longitude/latitude ranges. The venues identified in the vicinity of such a location are then considered to be hypothetical visits.

Note that in one embodiment the system maintains a set of mappings that correlate a venue to an activity type. The system uses these mappings to derive a set of activity types in operation 306. For example, restaurants are mapped to the "eat" activity type, theaters are mapped to the "see" activity type, and gyms are mapped to the "do" activity type. The system can adopt any activity-type categorization scheme.

In addition to mapping a venue to an activity type, the system can optionally extract attributes of the venue and associate those attributes to the activity type and contextual information. For example, a take-out restaurant may have an attribute of "take out," as opposed to "dine in." This attribute can then be associated with the user's contextual information, for example the time of the day which can be, say, 12 pm, and/or a weather condition such as sunny or rainy. Later, when the same user makes a query for activities around noon while the weather is sunny, the system would know that one of the activities the user could enjoy is to order take-out food for lunch. The probability of the user actually preferring take-out food for lunch when the weather is sunny can be computed using a statistical process.

Note that generating activity clusters is only one way to build an activity inference model. Other approaches, such using a decision tree, a neural network, a Bayesian inference procedure, and so on can also be used to build such a model. It is optional for the system to use activity clustering when applying these approaches.

Generating an Activity Inference Model

Figure 4:
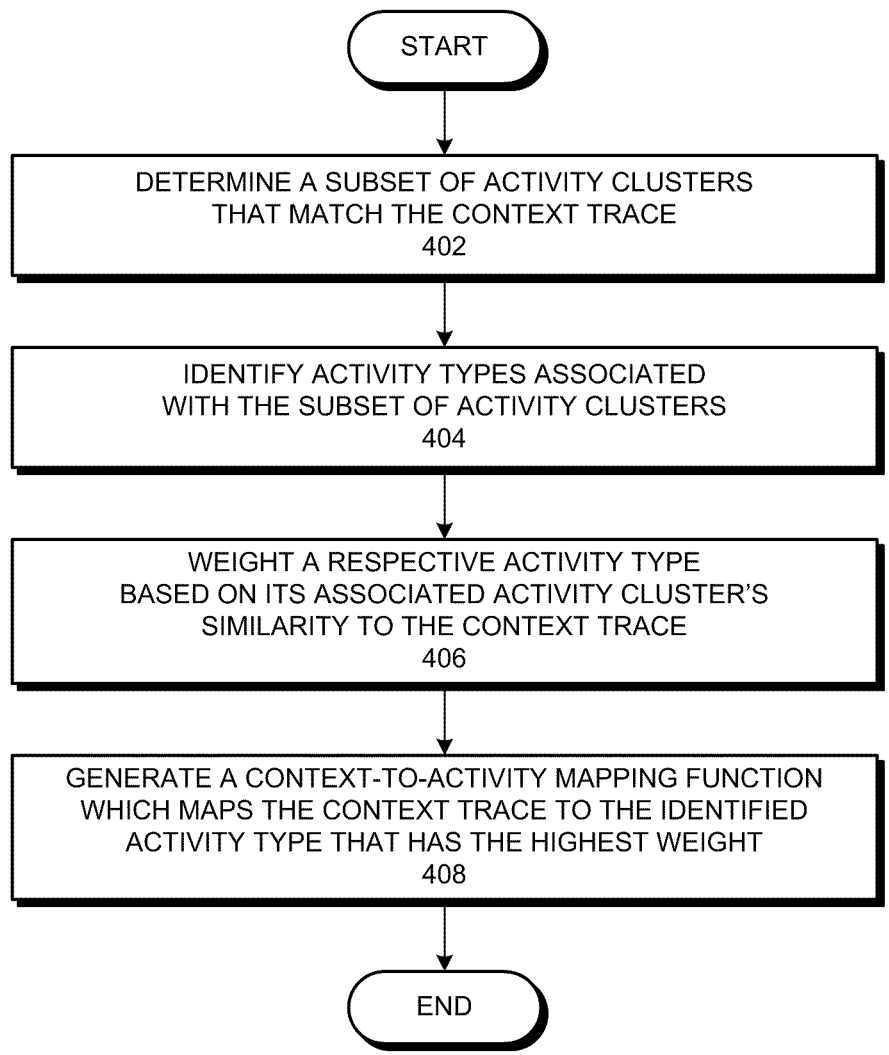
FIG. 4 presents a flow chart illustrating a process for generating an activity inference model in accordance with an embodiment.

FIG. 4 presents a flow chart illustrating a process for generating an activity inference model in accordance with an embodiment. During operation, the system determines, for a context trace associated with the user, a subset of inference points that match the context trace (operation 402). Then, the system identifies a number of activity types associated with the subset of inference points (operation 404). Next, the system weights a respective activity type based on its associated inference point's similarity to the context trace (operation 406). The system then generates a context-to-activity mapping function for the activity inference model, which maps the context trace to the identified activity type that has the highest weight (operation 408).

In some embodiments, the context-to-activity mapping function accounts for various distributions of weights that are assigned to activity types. In other words, the context-to-activity mapping function can account for different combinations of context parameters to derive an activity type that is appropriate for a given combination of a user's context parameters.

Note that there can be a number of venues, and a corresponding number of hypothetical visits to these venues associated with one context trace. This does not mean that a user can simultaneously visit multiple venues. The system uses these hypothetical visits during operation 402 to derive an activity distribution associated with a particular location and a set of contextual data.

For example, if there are three restaurants, two bars, and one department store located in the vicinity of a specific location, and the corresponding timestamp points to 5 pm on a Saturday, the system may derive that there is a 50% chance that the user is eating, a 33% chance that the user is drinking, and a 17% chance that the user is shopping at 5 pm on a Saturday. In one embodiment, the system also takes the distance of the venue from the location measured for the user into account when calculating the probability that the user is engaged in the activity associated with the venue.

Furthermore, the system can generate a set of activity labels during operation 404, such that an activity label is associated with a location, and can include a distribution of various activity types. In addition, an activity label can specify a set of associated contextual information, such as time of day, time range, day of week, range of days of a week, date, range of dates, weather condition, traffic condition, social context, sensed motion, ambient sound, and ambient video feed.

For the same user the system typically performs the off-line preprocessing as described above on multiple GPS traces and obtains a number of activity labels. Some of these labels would be associated with similar contextual information. As a result, the system can learn that certain contextual information is more likely to be correlated with certain types of activities and/or activity attributes. The process is most effective when there are multiple independent samples of the user's behavior such as contexts measured on different calendar dates in different parts of the city but sharing contextual data values such as time of day or current weather conditions.

TABLE I presents three exemplary labels extracted from context traces taken on different days in accordance with one embodiment of the present invention. Each label indicates an activity-type distribution based on the hypothetical visits, and a set of contextual information which in this case includes the time of day and day of week. Although the system cannot derive which activity is more likely to occur based on a single label, the system can nevertheless derive that the user is more likely to be eating around 12:00 pm during the weekdays. Note that the labels shown in TABLE I are only simplified examples. In an actual system, each label may contain more information. A label may contain more activity types, and each activity type may be associated with one or more attributes. For example, the "eating" activity type may be associated with cuisine type, restaurant type, price range, and so forth. Each label may also include much more detailed contextual information, such as local traffic conditions.

TABLE I

Relevant Contexts to Activity Label Inferences

| Location and Context | Hypothetical Visits to Nearby Venues | Inferred Activity |
|---|---|---|
| Location = x1, y1; time = 12:00 pm; day = Monday | Jo's Restaurant, Sam's Bookstore | Eating 50%; Shopping 50% |
| Location = x2, y2; time = 12:10 pm; Day = Tuesday | Happyville School, Pete's Restaurant | Studying 50%; Eating 50% |
| Location = x3, y3; time = 12:05 pm; day = Thursday | Sally's Restaurant, Bill's Auto Garage | Eating 50%; Driving 50% |

In the current embodiment, the similarity of one context to another (e.g., the similarity of the user's context to contexts associated with an inference point) is calculated based on a multi-attribute distance metric defined over context variables. In other words, the system computes a logical "distance" between the mapping's context and the query's context. The system can employ different ways to compute this logical distance. For example, if the contextual information of interest is time of day, the system may use the difference in minutes as the logical contextual distance. In other embodiments, the system may use the actual physical distance between the mapping context's location and the user's query context location as the logical contextual distance. Other definitions of context similarity are also possible. In other embodiments, context-to-activity mappings for other users can also be weighted in to enable users whose interests fall into similar categories to benefit from data collected on other members of the same class.

Note that a context relevant to a user can be used to make predictions about the probability of various possible activities. During operation 406, the system computes weights to combine the predictions for the relevant contexts previously retrieved. In one embodiment, the system assigns a weight to each mapping based on the similarity metric or logical distance between a context specific to a user and a context associated with an inference point.

The system then allocates evidence from the mappings with the most similar contexts to each of the possible activity types. One method of doing this is captured as follows. Let $m_i$ be the $i^{th}$ relevant mapping and $m_i(a)$ be an indicator function which returns 1 if activity a is predicted by mapping i and zero otherwise; and $w_i$ be the weight based on a function of the similarity of the mapping's context to the user's current context. Then e(a), the evidence for activity a would be:

$$e(a) = \sum_i w_i m_i(a)$$

In some embodiments, the system can generate the activity type distribution based in part on a machine learning classifier. For example, the system can normalize the weighted evidence to create a distribution over the user's intended activity type.

$$Pr(a) = \frac{e(a)}{\sum_a e(a)}$$

Other ways of generating the activity type distribution are also possible.

A recommender system can recommend activities based on the activity type distribution produced by operation 406 to improve the effectiveness of its recommendations. For example, if the system determines that a user query is submitted in a context where the time is 12:00 pm on a Tuesday, then the activity type distribution might be 60% eating, 20% shopping, and 20% exercising. A recommender system could use this distribution to return six recommendations of restaurants, two recommendations of shops, and two recommendations of local gyms, and disregard museum recommendations. By doing so, the recommender system presents activities that the user is most likely to be interested in, and saves the user from searching through irrelevant recommendations.

Moreover, for a context where the time is 8:00 am on a Tuesday, the recommender system may determine that the user is commuting to work, and may provide the user with transportation assistance. For example, the system may inform the user of any traffic accidents along the user's typical commute and/or may provide the user with an optimal commuting route to the user's workplace.

Note that the inference model described herein can have various context-aware applications beyond making activity recommendations. For example, the system can be used for context-aware time billing, streaming of multimedia content, and transportation assistance. Other applications are also possible.

In some embodiments, the system can use the user's contextual information to automate certain tasks for the user. For example, the system can keep track of the tasks being performed by a user, and can keep track of the time spent on each task for billing purposes. Moreover, the system can update the user's Weblog to include some details of the user's activities.

Note that, during operation 408, the system generates a context-to-activity mapping function based on the activities with the highest weight for a corresponding set of context traces. During runtime, the system can receive a query that includes contextual information for a user, and the system uses the context-to-activity mapping function to determine an activity that corresponds to the query. More specifically, the context-to-activity mapping function provides an efficient solution for determining an activity from contextual information without having to analyze a set of inference points at runtime.

Figure 5:
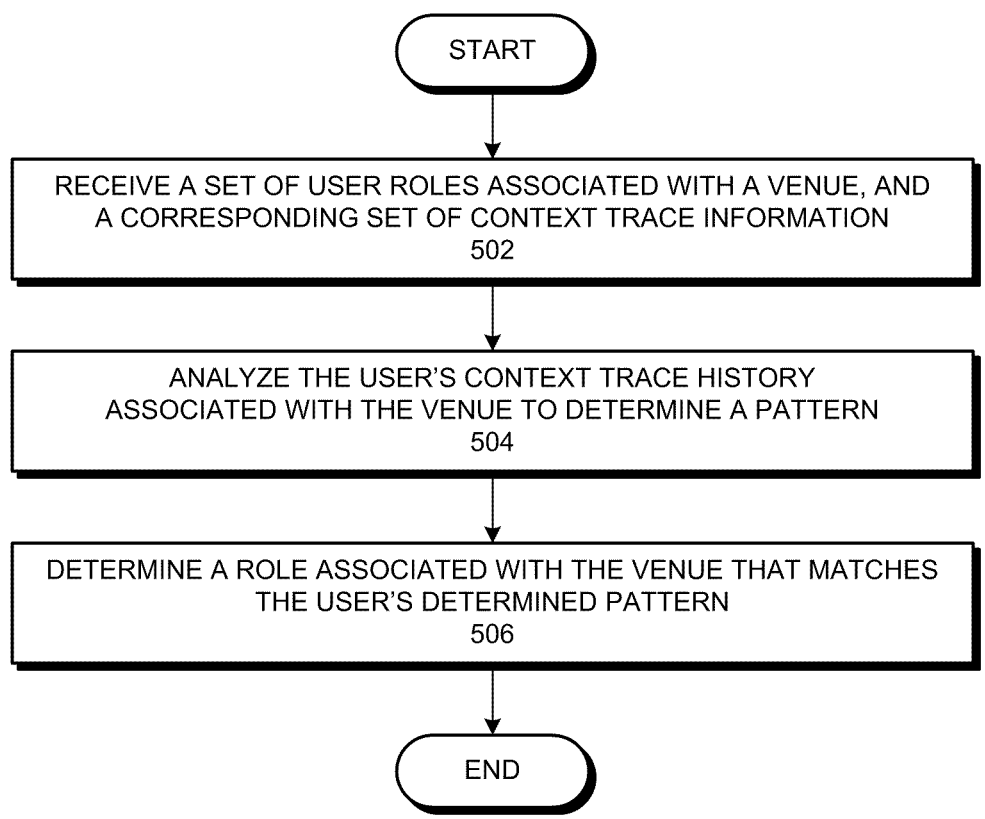
FIG. 5 presents a flow chart illustrating a process for determining a context for a user that is specific to a venue in accordance with an embodiment.

FIG. 5 presents a flow chart illustrating a process for determining a context for a user that is specific to a venue in accordance with an embodiment. During operation, the system receives a set of user roles associated with a venue, and a corresponding set of context trace information (operation 502). Then, the system analyzes the user's context trace history associated with the venue to determine a pattern (operation 504). The system then determines a role associated with the venue that matches the user's determined pattern (operation 506). For example, the system may determine that a user visits a hospital on most weekdays and some weekends, and may generate a context for the user that indicates the user is an employee of the hospital. Furthermore, the system may determine that another user visits the hospital (or any other hospital) at most a few times per year, and may generate a context for this user which indicates that this user is a patient or a visitor of the hospital. This additional context information that indicates a relationship between a specific user and a specific venue further simplifies the task of determining an activity for a user, because it takes advantage of context information that is specific to the user to infer an activity that best matches the user's life pattern.

Context Traces

Figures 6, 7:
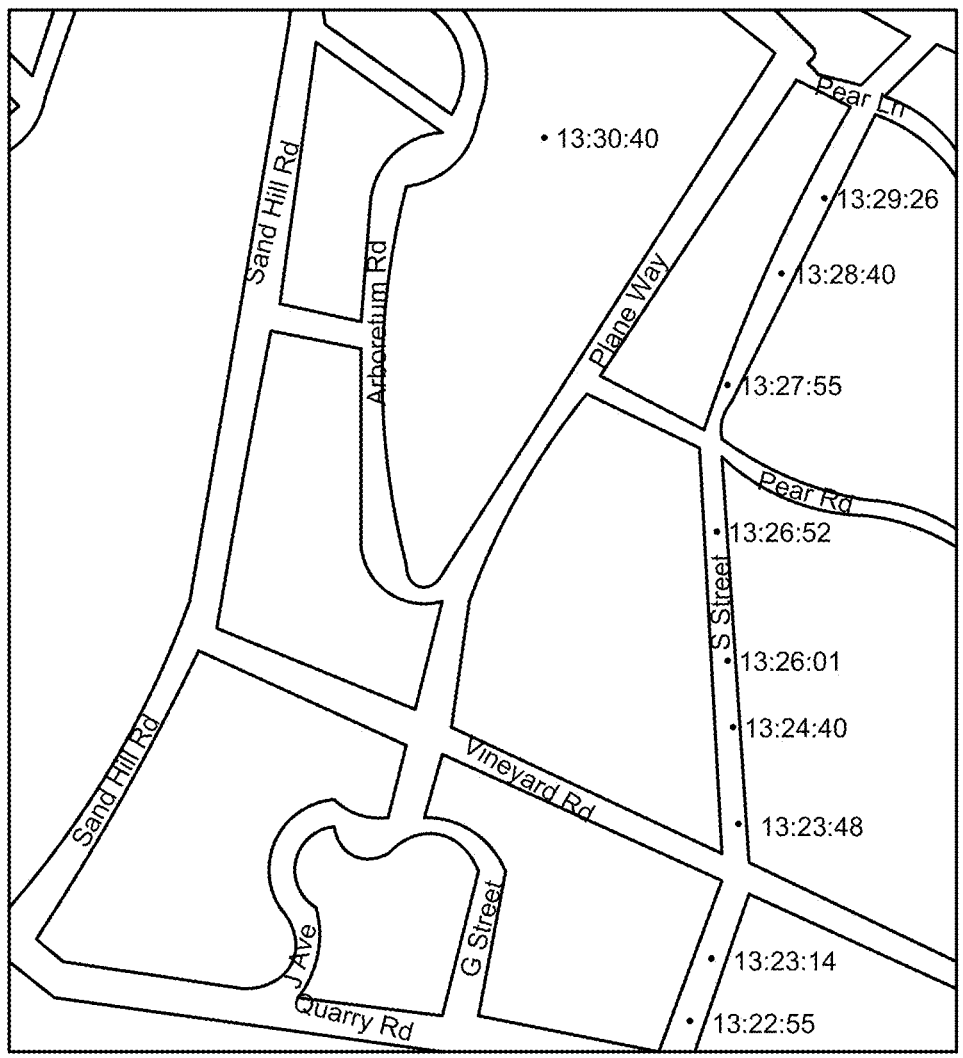
FIG. 6 illustrates a mapping of an exemplary context trace on a map in accordance with one embodiment of the present invention.
FIG. 7 illustrates a portion of an exemplary context trace that stores a user's location and time information in accordance with one embodiment of the present invention.

FIG. 6 illustrates a mapping of an exemplary context trace on a map in accordance with one embodiment of the present invention. As shown in this example, a context trace indicates a number of points which can be represented spatially on a map. During a certain time span, there may be more GPS data points concentrated in a specific location, which indicates that the user is spending a substantial amount of time in that area. In other parts of FIG. 6, the GPS data points are sparser, which indicates that the user is only passing by those locations. During the activity type analysis process, the system can filter out the sparse data points and focus on the clustered data points, which indicate the locations where the user is spending most of his time. When the location signal is known to have been interrupted, a predictive model can be used to interpolate likely location samples missing from the trace.

FIG. 7 illustrates a portion of an exemplary context trace that stores a user's location and time information in accordance with one embodiment of the present invention. In one embodiment, each context trace data point includes a user identifier, a latitude, a longitude, and a timestamp indicating the time when the user was at the location specified by the latitude/longitude pair.

Venue Information and Activity Labels

Figure 8:
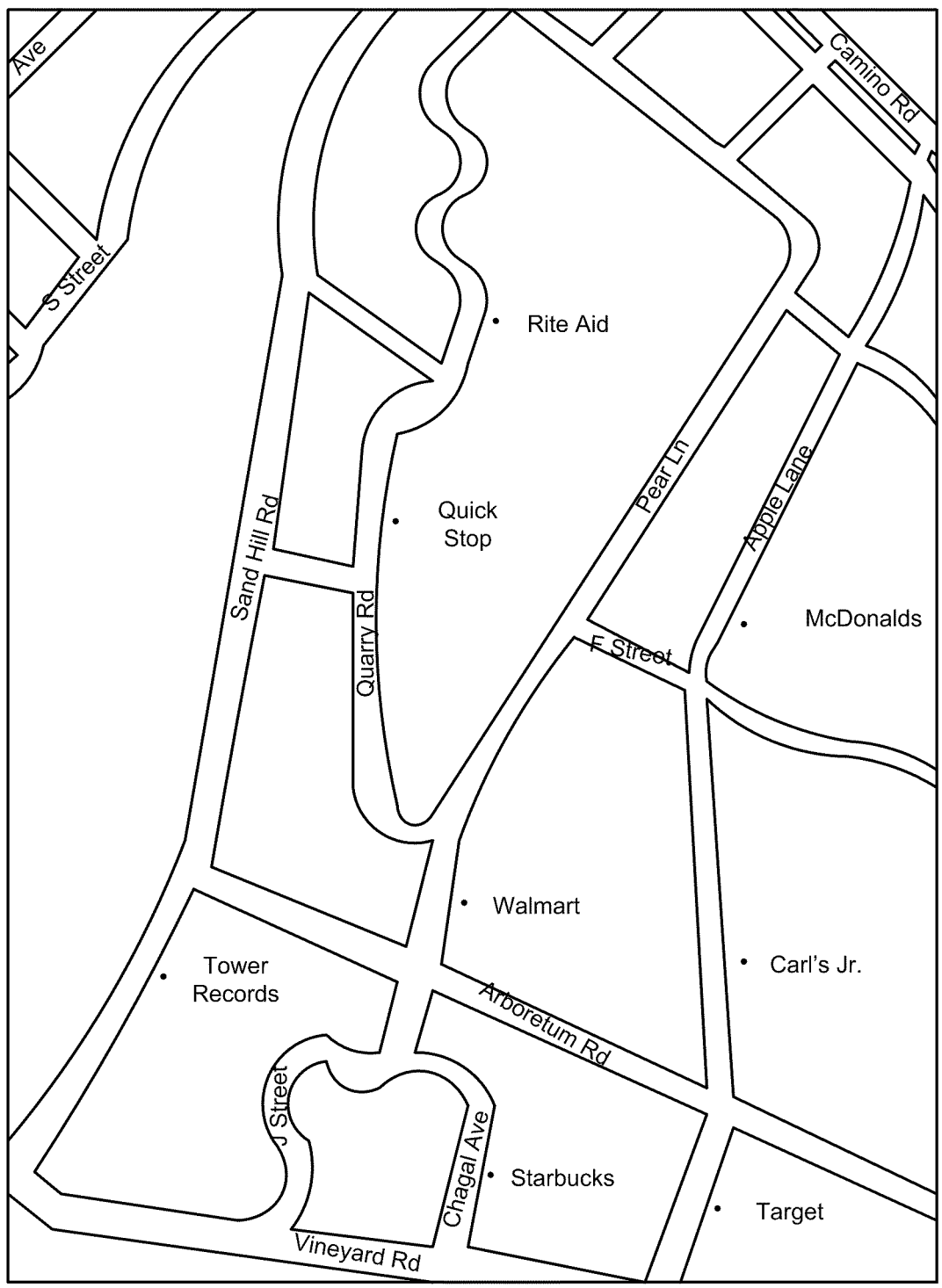
FIG. 8 illustrates a portion of the data stored in a venue database represented spatially on a map in accordance with one embodiment of the present invention.

FIG. 8 illustrates a portion of the data stored in a venue database represented spatially on a map in accordance with one embodiment of the present invention. In this example, a large number of venues are displayed over a map. Each venue is indicated by its location, which is presented by a black dot, and the venue's name. In the actual venue database, each venue entry may include a venue type (e.g., restaurant, museum), a latitude/longitude pair to indicate its location, a venue name, a brief venue description, and optionally one or more venue attributes (e.g., cuisine types, smoking/non smoking). The actual format of the stored venue data may vary from system to system. Other data formats are also possible.

Figure 9:
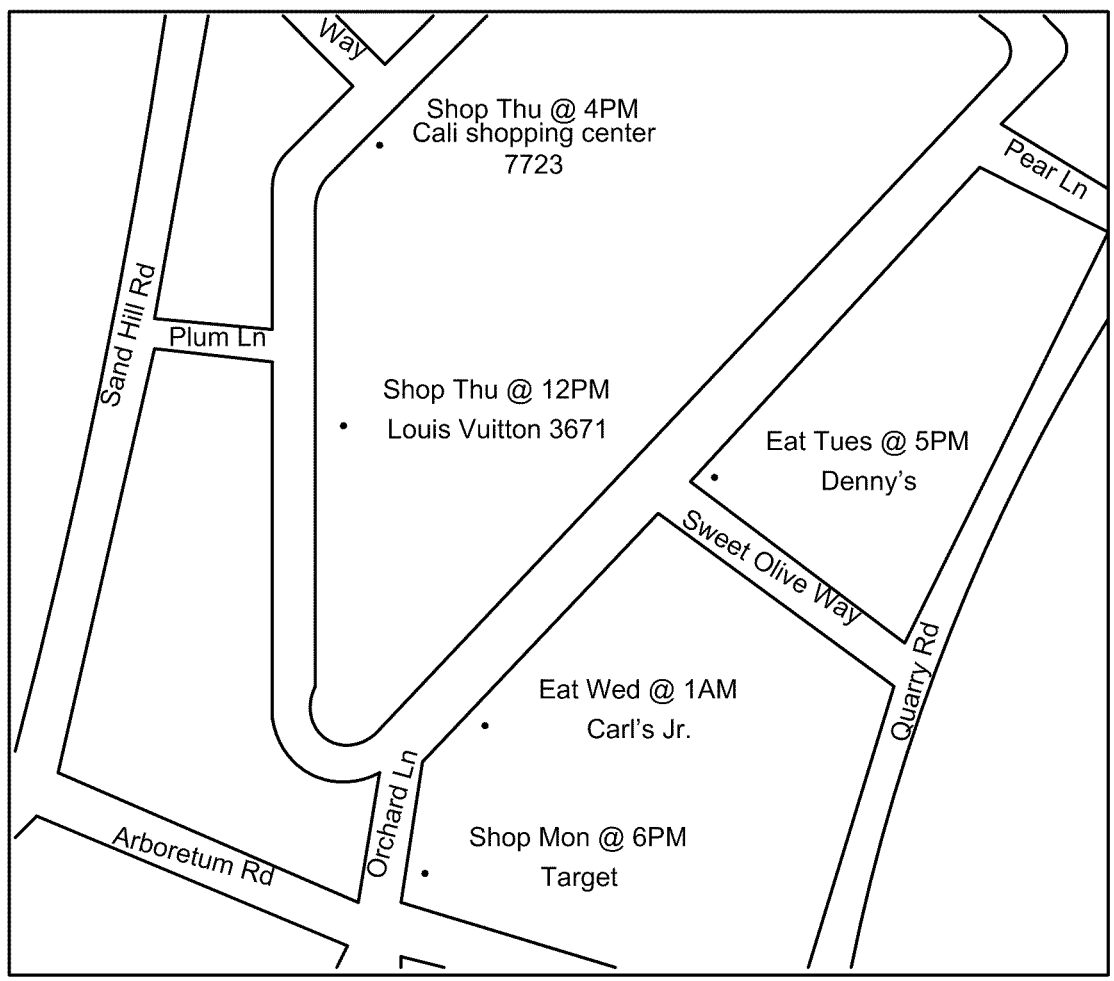
FIG. 9 illustrates a set of activity labels represented spatially on a map in accordance with the present invention.

FIG. 9 illustrates a set of activity labels represented spatially on a map in accordance with the present invention. As shown on the map in FIG. 9, each context-to-activity mapping specifies data values for context variables, such as location, a day of week, a time of day, as well as an activity type. Note that in practice a context-to-activity label mapping can include more than one activity type that implicitly specifies a probability distribution among all the activity types at that location. Furthermore, the context-to-activity mapping can include more contextual information, such as weather conditions.

Figure 10:
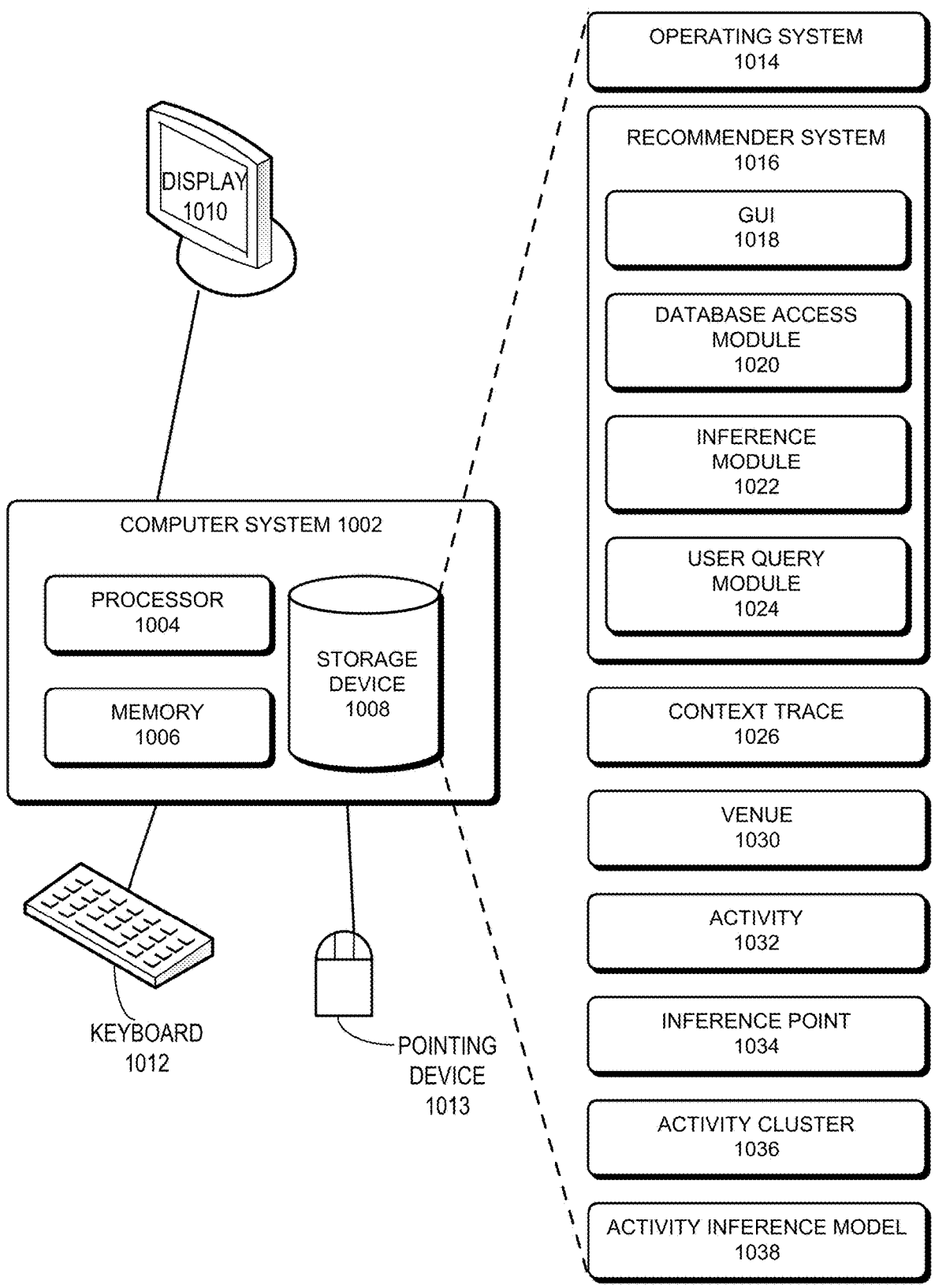
FIG. 10 illustrates an exemplary computer system that facilitates generating an inference model that determines an activity for a user in accordance with an embodiment of the present invention.

FIG. 10 illustrates an exemplary computer system that facilitates generating an inference model that determines an activity for a user in accordance with an embodiment of the present invention. Computer system 1002 includes a processor 1004, a memory 1006, and a storage device 1008. Furthermore, computer system 1002 can be coupled to a display device 1010, a keyboard 1012, and/or a pointing device 1013.

Storage device 1008 stores at least one of an operating system 1014, a recommender system 1016, a context trace 1026, a venue 1030, an activity 1032, an inference point 1034, an activity cluster 1036, and an activity inference model 1038. Furthermore, recommender system 1016 can include a graphical user interface (GUI) 1018, a database access module 1020, an inference module 1022, and a user query module 1024.

During operation, computer system 1002 loads recommender system 1016 from storage device 1008 into memory 1006, and executes recommender system 1016 on processor 1004. During an off-line preprocessing operation, database access module 1020 can access a user context-trace database and a venue database to receive historical context trace information (e.g., context trace 1026), and to receive venue information (e.g., venue 1030). Then, for context trace 1026 and venue 1030, inference module 1022 determines a corresponding activity 1032, and generates an inference point 1034 for the related data points 1026-1032. Next, the inference module 1022 generates activity cluster 1036 for a set of inference points that are substantially similar. Inference module 1022 then uses a set of inference points and/or activity clusters to generate activity inference model 1038. Furthermore, during a runtime query processing operation, user query module 1024 can use activity inference model 1038 to determine an activity 1032 from a context trace 1026 associated with a user.

Figure 11:
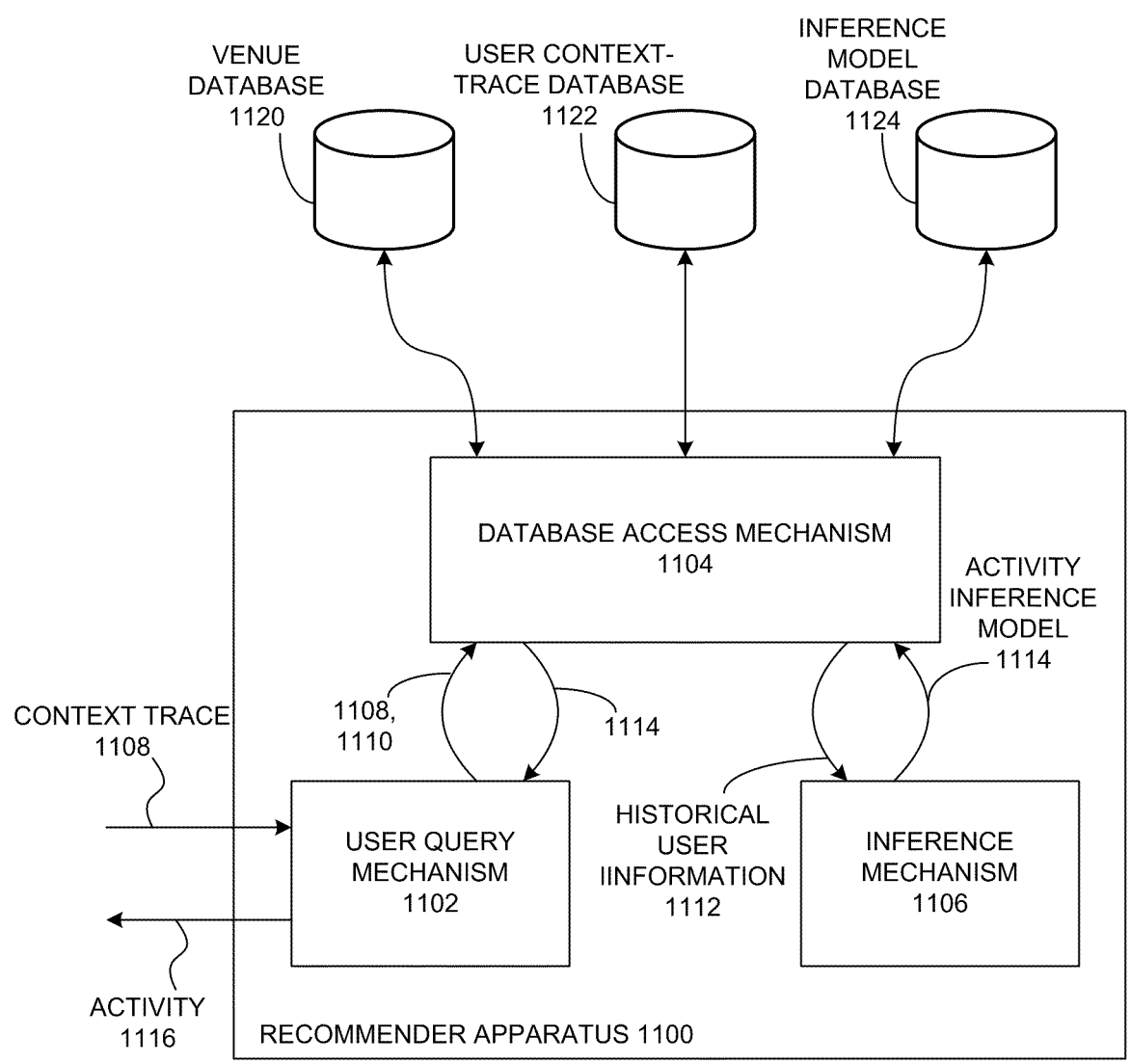
FIG. 11 illustrates an exemplary apparatus that facilitates generating an inference model that determines an activity for a user in accordance with an embodiment of the present invention.

FIG. 11 illustrates an exemplary apparatus that facilitates generating an inference model that determines an activity for a user in accordance with an embodiment of the present invention. Apparatus 1100 can comprise a number of mechanisms which may communicate with one another via a wired or wireless communication channel. Apparatus 1100 may be realized using one or more integrated circuits, and it may be integrated in a computer system, or it may be realized as a separate device which is capable of communicating with other computer systems and/or devices. Specifically, recommender apparatus 1100 can include a user query mechanism 1102, a database access mechanism 1104, and an inference mechanism 1106.

During an off-line preprocessing operation, database access mechanism 1104 can access a venue database 1120, a user context-trace database 1122, and a venue database 1120 to receive historical user information 1112 (e.g., a context trace and a corresponding venue). Then, inference mechanism 1106 generates activity inference model 1114 based in part on historical user information 1112, and stores activity inference model 1114 in an inference model database 1124. Furthermore, during a runtime query processing operation, user query mechanism 1102 receives a context trace 1108 from a user, and can use activity inference model 1114 to determine an activity 1116 associated with a user. User query mechanism 1102 can also configure database access mechanism 1104 to store context trace 1108 on user context-trace database 1122 to expand historical user information 1112.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The above description has been presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described in the detailed description can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. A computer-implemented method for activity inference from contextual information, the method comprising:
   receiving, by a computer associated with a user's activity, a set of contextual information of the user;
   generating a set of inference points, each of which is represented by a set of variables that indicates an association between the contextual information, a location, and an activity of the user, from the set of contextual information, wherein a respective inference point includes data values for the set of variables;
   computing a logical distance between the data values of a first set of variables in a first inference point and a second set of variables in a second inference point in the set of inference points;
   grouping the first and second inference points into an activity cluster in response to the logical distance being lower than a predetermined threshold, wherein the activity cluster is associated with a corresponding activity type;
   generating an activity inference model based on the activity cluster, wherein the activity inference model includes a data structure comprising a context-to-activity mapping that allocates respective weights to different contexts with respect to the activity type;
   applying a context trace for the user to the inference model as an input parameter, wherein the context trace indicates a number of points spatially represented on a map based on corresponding location information of the computer;
   determining, based on the context-to-activity mapping, that the context trace corresponds to the activity type;
   updating the activity inference model that corresponds to the activity cluster based on the context trace; and
   presenting a recommendation that includes one or more activities associated with the activity type.

2. The computer-implemented method of claim 1, wherein the set of contextual information includes a number of timestamped location coordinates.

3. The computer-implemented method of claim 1, wherein the set of contextual information includes venue-specific contextual data, which indicates a correct activity type from one or more activities associated with a venue.

4. The computer-implemented method of claim 1, wherein a respective instance of contextual information in the set of contextual information indicates one or more of: an in-person communication of the user, a sensed motion, an ambient sound, and an ambient video feed.

5. The computer-implemented method of claim 1, further comprising determining a context specific to a first venue for the user by:
   receiving contextual information associated with the first venue;
   analyzing the contextual information associated with the first venue to determine at least a pattern in timing of visits by the user to the first venue; and
   determining, for the user, a form of employment at the first venue or a status as a customer of the first venue that matches at least the determined pattern in timing.

6. The computer-implemented method of claim 5, wherein the determined form of employment at the first venue or the determined status as a customer of the first venue is determined in conjunction with the activity inference model.

7. The computer-implemented method of claim 5, further comprising determining an activity type for the user that corresponds to the determined form of employment at the first venue or the determined status as a customer of the first venue.

8. A non-transitory computer-readable storage medium storing instructions that when executed by a computer, which is associated with a user's activity, cause the computer to perform a method for activity inference from contextual information, the method comprising:
   receiving, by the computer, a set of contextual information of the user;
   generating a set of inference points, each of which is represented by a set of variables that indicates an association between the contextual information, a location, and an activity of the user, from the set of contextual information, wherein a respective inference point includes data values for the set of variables;
   computing a logical distance between the data values of a first set of variables in a first inference point and a second set of variables in a second inference point in the set of inference points;
   grouping the first and second inference points into an activity cluster in response to the logical distance being lower than a predetermined threshold, wherein the activity cluster is associated with a corresponding activity type;
   generating an activity inference model based on the activity cluster, wherein the activity inference model includes a data structure comprising a context-to-activity mapping that allocates respective weights to different contexts with respect to the activity type;
   applying a context trace for the user to the inference model as an input parameter, wherein the context trace indicates a number of points spatially represented on a map based on corresponding location information of the computer;
   determining, based on a the context-to-activity mapping, that the context trace corresponds to the activity type;
   updating the activity inference model that corresponds to the activity cluster based on the context trace; and
   presenting a recommendation that includes one or more activities associated with the activity type.

9. The computer-readable storage medium of claim 8, wherein the set of contextual information includes a number of timestamped location coordinates.

10. The computer-readable storage medium of claim 8, wherein the set of contextual information includes venue-specific contextual data, which indicates a correct activity type from one or more activities associated with a venue.

11. The computer-readable storage medium of claim 8, wherein a respective instance of contextual information in the set of contextual information indicates one or more of: an in-person communication of the user, a sensed motion, an ambient sound, and an ambient video feed.

12. The computer-readable storage medium of claim 8, wherein the method further comprises determining a context specific to a first venue for the user by:
   receiving contextual information associated with the first venue;
   analyzing the set of contextual information associated with the first venue to determine at least a pattern in timing of visits by the user to the first venue; and
   determining, for the user, a form of employment at the first venue or a status as a customer of the first venue that matches at least the determined pattern in timing.

13. The computer-readable storage medium of claim 12, wherein the determined form of employment at the first venue or the determined status as a customer of the first venue is determined in conjunction with the activity inference model.

14. The computer-readable storage medium of claim 12, wherein the method further comprises determining an activity type for the user that corresponds to the determined form of employment at the first venue or the determined status as a customer of the first venue.

15. A computer system, which is associated with a user's activity, for activity inference from contextual information, the computer system comprising:
   a processor; and
   a non-transitory computer-readable storage medium storing instructions which when executed by the processor cause the processor to perform a method, the method comprising:
   receiving a set of contextual information of the user;
   generating a set of inference points, each of which is represented by a set of variables that indicates an association between the contextual information, a location, and an activity of the user, from the contextual information, wherein a respective inference point includes data values for the set of variables;
   computing a logical distance between the data values of a first set of variables in a first inference point and a second set of variables in a second inference point in the set of inference points;
   grouping the first and second inference points into an activity cluster in response to the logical distance being lower than a predetermined threshold, wherein the activity cluster is associated with a corresponding activity type;
   generating an activity inference model based on the activity cluster, wherein the activity inference model includes a data structure comprising a context-to-activity mapping that allocates respective weights to different contexts with respect to the activity type;

applying a context trace for the user to the inference model as an input parameter, wherein the context trace indicates a number of points spatially represented on a map based on corresponding location information of the computer system;

determining, based on the context-to-activity mapping, that the context trace corresponds to the activity type;

updating the activity inference model that corresponds to the activity cluster based on the context trace; and presenting a recommendation that includes one or more activities associated with the activity type.

16. The computer system of claim 15, wherein the set of contextual information includes a number of timestamped location coordinates.

17. The computer system of claim 15, wherein the set of contextual information includes venue-specific contextual data, which indicates a correct activity type from one or more activities associated with a venue.

18. The computer system of claim 15, wherein a respective instance of contextual information in the set of contextual information indicates one or more of: an in-person communication of the user, a sensed motion, an ambient sound, and an ambient video feed.

19. The computer system of claim 15, wherein the determination mechanism is further configured to determine a context specific to a first venue for the user by:
receiving contextual information associated with the first venue;
analyzing the set of contextual information associated with the first venue to determine at least a pattern in timing of visits by the user to the first venue; and
determining, for the user, a form of employment at the first venue or a status as a customer of the first venue that matches at least the determined pattern in timing.

20. The computer system of claim 19, wherein the determined form of employment at the first venue or the determined status as a customer of the first venue is determined in conjunction with the activity inference model.

21. The computer system of claim 19, wherein the determination mechanism is further configured to determine an activity type for the user that corresponds to the determined form of employment at the first venue or the determined status as a customer of the first venue.

* * * * *